March 8, 1932. P. D. GOOD 1,848,343
APPARATUS FOR THE PRODUCTION OF COPRA
Filed Oct. 21, 1929
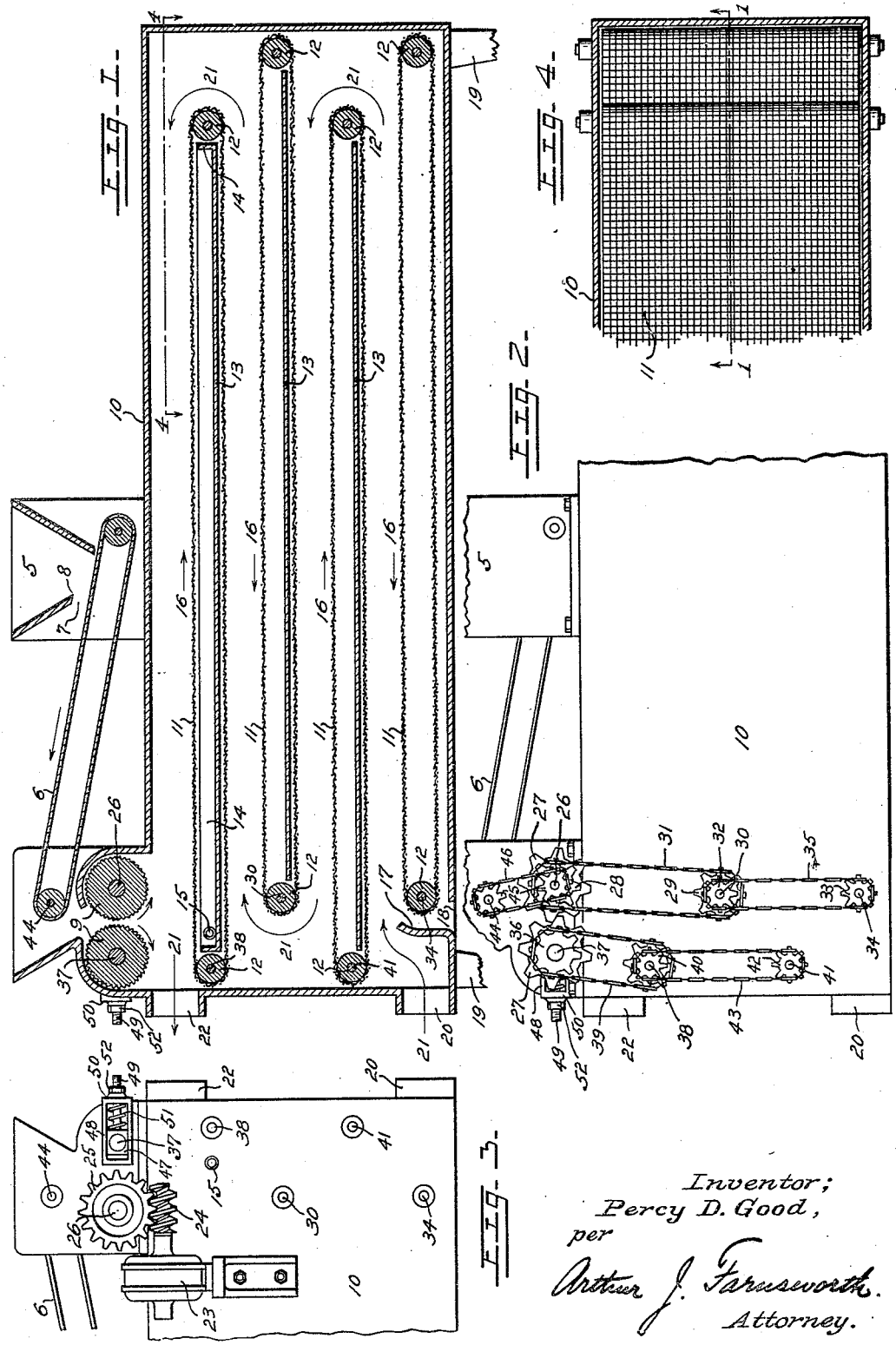
Inventor;
Percy D. Good,
per
Arthur J. Farnsworth
Attorney.

Patented Mar. 8, 1932

1,848,343

UNITED STATES PATENT OFFICE

PERCY D. GOOD, OF BITA PAKA, RABAUL, NEW GUINEA

APPARATUS FOR THE PRODUCTION OF COPRA

Application filed October 21, 1929. Serial No. 401,566.

In this specification, and the accompanying drawings, I shall describe and show a preferred manner of utilizing my invention and the apparatus therefor, and specifically mention certain of its more important objects. I do not limit myself, however, to the particular manner of utilizing my invention so set forth, since various modifications and changes may be made without departing from the spirit of the invention as hereinafter claimed; and objects and advantages, other than those specifically mentioned, are included within its scope. I desire that only such limitations shall be placed upon the invention claimed as are imposed by the prior art.

My invention relates to processes for drying the meat of coconuts for the production of copra, and apparatus therefor. Among its principal objects are: first, to devise a process for more satisfactorily producing copra of high quality; second, to provide means for materially reducing the time required for drying copra, and for thereby preventing fermentation and the growth of mould during the drying process; third, to effect a large reduction in the cost of labor required for drying, by the utilization of a substantially continuous process and suitable apparatus therefor; and, fourth, to accomplish the foregoing by means of a relatively simple process and inexpensive apparatus.

In the accompanying drawings I have illustrated a preferred form of apparatus for accomplishing the final steps of my improved process. It is to be understood that the drawings are purely diagrammatic however, and not pictorial. The parts have not been drawn to scale, and certain proportions have been much distorted for the sake of clearness in describing and imparting a knowledge of the invention. With the knowledge disclosed however, it will be a simple matter for any person who is skilled in this art to design apparatus suitable for utilizing my invention under any ordinary circumstances.

Referring to the drawings:—

Figure 1 is an elevation of my improved drying apparatus in longitudinal section, taken in the plane of line 1—1 of Fig. 4;

Figure 2 is an outside elevation of the left hand portion of the above apparatus;

Figure 3 is an outside elevation of the reverse side of the left hand portion of the apparatus shown in Figs. 1 and 2; and Figure 4 is a plan view in horizontal section of the right hand upper portion of the apparatus shown in Fig. 1, the section being taken in the plane 4—4 of indicated on the latter figure.

Similar reference numerals refer to similar parts throughout the several views.

The three principal methods that have been employed hitherto for drying copra, are first, exposing the coconut meats to the direct heat of the sun for two or three days; second, drying the meats in a smoke house for about two days; and, third, kiln-drying the meats for about one day. All of these bulk-drying systems commonly produce indifferently dried copra, the product being apt to be more or less damp, and sometime being partly burnt and partly mouldy. They are wasteful for these reasons, and the labor cost is relatively high. Furthermore copra produced by any of these processes is likely to be of somewhat inferior quality by reason of containing the fatty acids that result from fermentation during the slow drying.

My invention provides simple means whereby hygenic copra may be produced directly at the plantation by a desiccating process, at relatively small cost. The product of the process is free from fatty acids, burnt material, mould, or other deleterious matter. Oil and flour produced from such a product is exceptionally pure, and, in consequence, the product commands a relatively high price. The use of the process, since it can be employed directly at the plantation, makes is possible to effect a further saving by reducing transportation expense.

Proceeding now to a detailed description of my improved process, I have discovered that, after the coconuts are shelled, the dark skin covering the meats may be most advantageously removed by means of wire-brushing. Compared with the hitherto used method of paring off the dark skin, this effects a saving of both labor and material. Power rotated wire-brush wheels are preferable for this purpose. The skinned nuts are washed and afterwards broken, and the broken nut-meats are dumped into the intake hopper 5 of my machine. Beneath this hopper is a conveying belt 6, for removing the contents from the bottom of the hopper through the gap 7. The nut meats are spread over the conveyor belt in a fairly thin layer by means of the scraper edge 8. They are dumped off the left hand end of the conveyor belt, and fall between a pair of longitudinally corrugated crushing rolls 9. These rolls take the place of shredding or slicing apparatus, hitherto commonly employed for producing desiccated copra. They squeeze out a large portion of the moisture contained in the meats, and reduce the latter to the state of more or less finely divided pulp.

The crushing rolls are located above a drying-box 10, at one end thereof. Below the rolls, within the box, are a plurality of horizontal and/or inclined conveying belts 11 of wire screen fabric, mounted upon rotatable rollers 12 at their respective ends. These screen belts are disposed vertically in staggered arrangement as shown in the drawings, and are spaced to provide for a current of air therebetween. One end of each of these screen belts is close to the wall of the drying box, and the opposite end is spaced therefrom. Between the upper and lower portions of each of the screen-belts, except the lowermost, is a horizontal partition or baffle 13, extending between the respective rollers 12 and co-extensive with the width of the drying box. The uppermost of these baffles has an upstanding flange 14 co-extensive with its periphery, so as to constitute a shallow tray. An outlet pipe 15, leading to the outside of the drying box, serves to drain this tray.

The coconut meat, after being crushed by rolls 9, drops upon the upper screen-belt 11 and is carried thereby to the other end of the drying box. It is then dumped upon the screen-belt immediately below and carried back to the left hand end of the drying-box, where it is again dumped upon a lower screen-belt, etc., the respective screen-belts traveling slowly in the directions indicated by arrows 16. The completely dried copra is finely dumped from the lowermost screen-belt against a baffle plate 17, and then drops through a bottom orifice 18 of the drying-box into suitable receptacles, or upon a conveying belt for carrying away the finished product. Space beneath the drying box is provided for this purpose, as by mounting it upon suitable legs 19.

The drying of the copra is accomplished by means of a forced draft of heated air. The dry air enters the drying-box at the bottom at one end, through an air inlet 20. The course of the air through the drying-box is controlled by the baffles 13, and is as indicated by arrows 21. The air gradually becomes cooled and moisture-laden, and is finally discharged through the outlet 22.

It will be noted that the drying arrangement described is a counter-current apparatus. That is to say, the air flow at all times is in a direction opposite to the direction in which the copra is moving. This is for the reason that the incoming raw copra is both wet and cool. It becomes gradually heated and dried during its passage through the drying box. The hot dry air, entering through inlet 20, comes in contact first with the nearly dry copra, and removes the last traces of moisture therefrom. The air picks up more and more moisture as it progresses through the drying box, and leaves through outlet 22 heavily laden with moisture. It will also be noted that liquid squeezed out of the raw coconut meats by rollers 9 will fall into the upper baffle tray, directly below the top screen-belt, and be discharged therefrom through pipe 15. By the time the copra has reached the right hand end of the upper screen-belt, it will have ceased to drip, and its further drying must be accomplished by the heated air current.

All of the moving parts of the above described apparatus must have a relatively slow motion, and I have indicated a simple method for accomplishing this by means of a mechanical drive. The moving parts are positively geared together to work at pre-determined relative speeds. Power may be applied to the apparatus by means of the motor 23, worm 24, and worm-wheel 25, to shaft 26 of one of the crushing rolls. The opposite ends of the crushing roll shafts are mutually engaged through spur gears 27. A sprocket 28 is mounted upon this same end of shaft 26, and it drives a similar sprocket 29 on shaft 30 of the second screen-belt, by means of the chain 31. Another sprocket 32 is mounted upon this end of shaft 30, and it drives a similar sprocket 33 on screen belt shaft 34, by means of the chain 35.

Similarly a sprocket 36 on crushing roll shaft 37 drives screen-belt shaft 38 by means of a chain 39; and a sprocket 40 on shaft 38 drives screen-belt shaft 41 by means of sprocket 42 and chain 43.

Shaft 44 of conveyor belt 6 is driven from crushing roll shaft 26 by means of the sprockets 45 and chain 46.

It is desirable to mount one of the crushing rolls in yieldable bearings, to provide against breakage or stoppage due to overloading the rolls momentarily, as when uncrushable material is being discharged upon them. This can be easily accomplished by mounting shaft 37 in slidable bearings at each end, as indicated at 47 in Fig. 3. These bearings are adapted to slide horizontally between guides 48, for varying the distance between the rolls. The bearings carry studs 49, slidably projecting through cross-bars 50 of the guides. Helical compression springs 51 surround the studs and engage the bearings and the cross-bars under compression. Nuts 52 upon the studs cooperate with springs 51, and serve to position the shaft to provide the normal gap between the crushing rolls. The arrangement thus provides for the yielding of one of the rolls, by further compression of springs 31, when uncrushable material is passed between them, and prevents damaging the apparatus or stopping its operation.

As indicated above, my apparatus is susceptible of various minor changes, such as will readily occur to those skilled in the art to meet special conditions or to satisfy personal preferences. Thus, if preferred, screen-belts 11 can be co-extensive in length with the drying-box. In such case the baffles 13 remain as shown, and the air current passes up around the far end of the baffle plate, between it and the corresponding roller, to the underside of the screen-belt, and through the interstices therein and between the particles of copra thereon. Or the arrangement of the screen-belts may remain as shown, and baffles 13 may be shortened at the far end to allow the air current to divide; a portion of the current going around the roller and over the top of the screen, and a portion passing between the roller and the baffle plate to the underside of the screen-belt. Obviously any suitable form of mechanical power and gearing may be employed as desired.

I have found that the incoming air current should be at a temperature of approximately 170 degrees Fahr. or higher, to give satisfactory results, and the air should be thoroughly dried. There are many suitable forms of air heaters available for the purpose, and the air heater per se does not form a part of the present invention although some suitable form is essential for its operation. A firetube boiler, burning the husks and shells of the coconuts, can be used for the purpose, and a blower can be arranged for forcing air around the fire tubes for heating and drying it and for then discharging it into air inlet 20 of the drying box. Or a boiler similarly fired by husks and shells can be made to generate steam, and the air can be dried and heated in a suitable air heater employing steam coils fed from the boiler.

From the foregoing description it will be obvious that a large saving of labor can be accomplished by means of my above described process. A labor saving can be effected in the first place by the use of revolving wire brushes for removing the dark skin covering the coconut meats, as compared with the previously used method of hand-paring with knives. The crushing and drying apparatus is automatic in its operation and requires very little attention, with a further relatively large saving in the labor cost. Again, the process effects a very substantial saving in material by reason of the fact that very little of it is lost in wire-brushing, and much less than it lost by paring. A still further reduction of loss of material is effected by the fact that fermentation during drying is prevented, and because no opportunity is afforded for the growth of mould. The resulting product of the process is of the highest obtainable grade as to purity and form, and it commands the highest price in the commercial markets. Finally it will be seen that the simplicity and relative cheapness of the apparatus enables it to be used directly at the plantations with a substantial saving of transportation costs, since only the finished product is shipped.

Having thus fully described my invention, in a manner that will enable those skilled in the art to utilize it to the fullest extent, I claim:

1. Apparatus of the character described, comprising, a drying box; a plurality of horizontal continuous perforate belted conveyors respectively supported by and extending between pairs of rollers, spaced within said box in superposed longitudinally staggered arrangement; horizontal baffles, co-extensive with the width of said box and extending between all but the lowest pair of said rollers, between the upper and lower portions of the respective conveyors, adjacent said lower portions and spaced from said upper portions; means for causing said conveyors to move continuously in directions that are alternately opposite with respect to each other; means for depositing material upon the upper conveyor; means that include said staggered arrangement for discharging material from each conveyor but the lowest, upon the conveyor directly below; and means for removing said material from the lowest conveyor to the exterior of the box; said box being adapted for permitting a current of air to flow therethrough between said baffles in a zig-zag manner, from the bottom to the top, in directions opposite to the motion of the adjacent conveyors.

2. Apparatus as set forth in claim 1, wherein the upper baffle consists of a pan having means associated therewith for keeping it drained.

PERCY D. GOOD.